United States Patent [19]

Voeste et al.

[11] Patent Number: 4,854,943
[45] Date of Patent: Aug. 8, 1989

[54] PROCESS OF PRODUCING A GAS WHICH IS RICH IN CARBON MONOXIDE BY A CRACKING OF HYDROCARBONS

[75] Inventors: Theodor Voeste, Frankfurt; Emil Supp, Dietzenbach, both of Fed. Rep. of Germany

[73] Assignee: Metallgesellschaft Aktiengesellschaft, Frankfurt am Main, Fed. Rep. of Germany

[21] Appl. No.: 292,700

[22] Filed: Jan. 3, 1989

[30] Foreign Application Priority Data

Jan. 14, 1988 [DE] Fed. Rep. of Germany ....... 3800862

[51] Int. Cl.$^4$ .............................................. C01B 3/38
[52] U.S. Cl. .................................. 48/196 A; 48/212; 48/215; 252/373; 423/415 A
[58] Field of Search ................. 48/197 R, 196 A, 212, 48/213, 214 A, 215; 252/373; 423/415 A

[56] References Cited

U.S. PATENT DOCUMENTS

| | | | |
|---|---|---|---|
| 2,655,442 | 10/1953 | Mayland | 423/415 A |
| 2,767,233 | 10/1956 | Mullon et al. | 48/196 A |
| 2,976,134 | 3/1961 | Paull | 48/215 |
| 3,090,682 | 5/1963 | Bartholone et al. | 48/196 A |
| 3,138,438 | 6/1964 | Peras | 48/196 A |
| 4,788,004 | 11/1988 | Pinto et al. | 252/373 |

*Primary Examiner*—Peter Kratz
*Attorney, Agent, or Firm*—Sprung Horn Kramer & Woods

[57] ABSTRACT

Gases which are rich in carbon monoxide are produced by a catalytic cracking of gaseous or vaporized hydrocarbons. A part of the hydrocarbons is combusted with an oxygen-containing gas which is added at a rate that is twice to ten times the stoichiometric oxygen demand. The combuston temepratures are between 800° and 1500° C. The oxygen-containing combustion gas is admixed to the preheated remainder of the hydrocarbon and a mixture is produced which is at a temperature between about 700° and about 1300° C. That mixture is passed through a fixed bed consisting of a granular cracking catalyst. A high-CO product gas at a temperature between about 800° and about 1150° C. is withdrawn from the fixed bed.

5 Claims, 1 Drawing Sheet

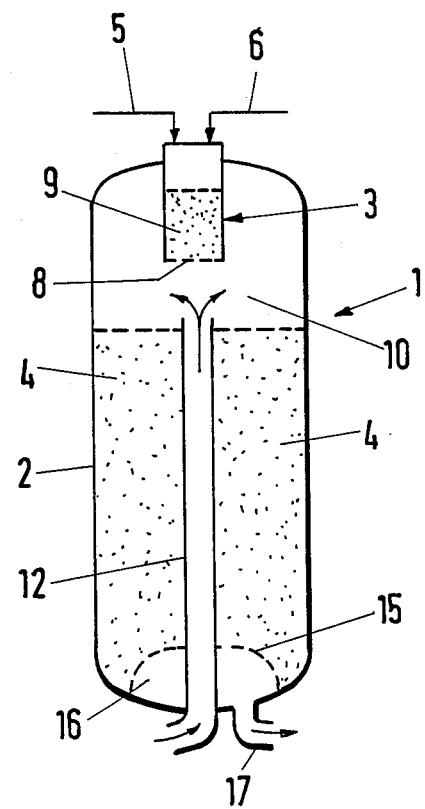

PROCESS OF PRODUCING A GAS WHICH IS RICH IN CARBON MONOXIDE BY A CRACKING OF HYDROCARBONS

BACKGROUND OF THE INVENTION

This invention relates to a process of producing a gas which is rich in carbon monoxide by a catalytic cracking of gaseous or vaporized hydrocarbons.

It is known that high-CO gases can be produced catalytically or thermally, without a catalyst, by a partial oxidation of gaseous or vaporized hydrocarbons. The catalytic partial oxidation, also called catalytic autothermal cracking, is effected without a supply of extraneous heat at temperatures between about 800° and about 1000° C. In order to prevent a formation of soot, about two moles of water vapors are used per mole of carbon. In the thermal partial oxidation process the reaction is effected at a temperature between 1300° and 1600° C. and there is no need to add water vapor. The formation of soot is tolerated in that case because it will not adversely affect the processing.

These two processes have disadvantages which oppose a formation of CO with the maximum yield from the hydrocarbon feedstock. In catalytic autothermal cracking, the addition of water vapor will result in a high $CO_2$ content in the product gas so that the yield of CO is content in the product gas so that the yield of CO is decreased below 70% of the carbon content of the hydrocarbons. Besides, more oxidizing agent is required than for a cracking without water vapor. Whereas a thermal cracking without a catalyst will result in a CO yield of 90% and more, the demand for oxidizing agent is large and the soot which has formed must be scrubbed from the product gas and must be disposed.

SUMMARY OF THE INVENTION

It is an object of the invention to produce a high-CO product gas without a formation of soot although water vapor is not added or is not added in a substantial amount. In the process described first hereinbefore this is accomplished in accordance with the invention in that a part of the hydrocarbons is completely combusted at temperatures of about 800° to 1500° C. in a combusion zone, which is supplied with an oxygen-containing gas at a rate which corresponds to twice to ten times the stoichiometric oxygen demand, the preheated remainder of the hydrocarbons is admixed to the oxygen-containing combustion gas and a mixture is produced at a temperature between about 700° and about 1300° C., the mixture is passed through a fixed bed of a granular cracking catalyst and a high-CO product gas at a temperature between about 800° and about 1150° C. is withd rawn from the fixed bed.

The feedstock used in the process may particularly consist of gaseous hydrocarbons, such as natural gas, although it is also possible to use vaporized hydrocarbons boiling up to about 160° C., such as naphtha. That part of the hydrocarbons which is supplied to the combustion zone amounts to about 10 to about 30% of the total rate of the hydrocarbon feedstock. The process is carried out under pressures between 1 and 35 bars, preferably between 1 and 10 bars.

A considerable surplus of oxygen must be maintained in the combustion zone because the temperature in the combustion zone would otherwise rise to such high values that the catalyst would be damaged.

The hydrocarbons are suitable combuste in the combustion zone in the presence of an igniting catalyst which contains, e.g., platinum or palladium and may contain nickel as a further component. But that igniting catalyst is not essential.

Owing to the preceding combustion of the hydrocarbons the mixture which is supplied to the fixed bed of the cracking catalyst contains $CO_2$ and a certain amount of water vapor and also contains about 10 to about 20% by volume residual oxygen. It will not be necessary in general to add water vapor to that mixture from the outside. In case of need, the water vapor content of the mixture may be increased in that water vapor is supplied in the combustion gas or in the preheated remaining hydrocarbons. In any case it will be sufficient if the mixture that is supplied to the cracking catalyst contains water vapor not in excess of 0.2 mole per mole of carbon.

BRIEF DESCRIPTION OF THE DRAWING

Embodiments of the invention will be explained with reference to the drawing which shows apparatus for carrying out the process according to the present invention.

DETAILED DESCRIPTION OF THE INVENTION

A pressure-resisting casing 2 of a reactor 1 surrounds a combustion chamber 3 and a fixed bed 4 consisting of a granular cracking catalyst. A part of the hydrocarbons to be reacted is supplied in line 5 to the combustion chamber 3. An oxygen-containing gas, such as air, is supplied in line 6 at the same time and in an amount which corresponds to twice to ten times the stoichiometric oxygen demand.

The combustion chamber 3 contains, on a grate 8, a fixed bed 9 consisting of a granular igniting catalyst. Owing to the surplus of oxygen and the presence of the igniting catalyst, an intense complete combustion is effected in the chamber 3. The combustion gases consisting mainly of $CO_2$ and $H_2O$ as well as residual oxygen are at a temperature between about 800° and 1500° C. and preferably between about 1000° and about 1300° C. as they flow downwardly through the grate 8 into the catalyst-free mixing chamber 10.

The remainder of the hydrocarbons to be reacted is preheated to about 300° to about 600° C. and througH the central supply pipe 12 is also supplied to the mixing chamber and is rapidly mixed therein with the combustion gas from chamber 3. The mixture then flows through fixed bed 4 and is reacted on the cracking catalyst, which contains, e.g., 10 to 30% nickel on a support that consists of $Al_2O_3$ and/or $MgO$. The fixed bed 4 of catalyst is supported on a grate 15, which is disposed over a chamber 16 for collecting the product gas. The high-CO product gas is at a temperature between about 800° and about 1150° C. as it is withdrawn through the outlet 17.

EXAMPLE

The combustion chamber 3 of a reactor as shown on the drawing was supplied through line 5 with 6 $sm^3$ methane, which has been preheated to 500° C. Together with 284 $sm^3$ air at 600° C., the methane is combusted on an igniting catalyst, which contains palladium. The oxygen is supplied in a quantity which is three times the stoichiometric oxygen demand. A pressure of about 6.5 bars is maintained in the combustion chamber and a pressure of about 6 bars in the lower portion of the reactor 1.

290 sm³ of a combustion gas having the following combustion are produced in the chamber 3:

| | |
|---|---|
| CO₂ | 6.0 sm³ |
| H₂O | 12.0 sm³ |
| N₂ | 225.2 sm³ |
| O₂ | 46.8 sm³ |
| Total | 290.0 sm³ |

94 sm³ methane from pipe 12 were admixed to that combustion gas to produce a gas mixture which is at a temperature of 930° C. and is composed as follows:

| | |
|---|---|
| CO₂ | 1.56% by volume |
| H₂O | 3.13% by volume |
| N₂ | 58.65% by volume |
| O₂ | 12.18% by volume |
| CH₄ | 24.48% by volume |

Owing to the arrangement in the reactor the gas mixture will enter the fixed bed 4 formed by the cracking catalyst after a residence time of less than 0.5 second in the mixing chamber 10. The cracking catalyst contains 20% nickel on a support of Al₂O₃. The residence time of the mixture to be reacted in the fixed bed 4 is about 10 seconds. The product gas is at a temperature of 950° C. as it is withdrawn through the outlet 17 and is composed as follows:

| | |
|---|---|
| CO₂ | 0.92% by vol. |
| CO | 17.94% by vol. |
| H₂ | 35.00% by vol. |
| N₂ | 43.14% by vol. |
| CH₄ | 0.28% by vol. |

| | |
|---|---|
| -continued | |
| H₂O | 2.72% by vol. |

93.7% of the carbon which has been supplied to the process in the methane feedstock was contained as CO in the product gas obtained. That high production of CO is mainly due to the fact that no water vapor is added.

What is claimed is:

1. In a process for producing a gas which is rich in carbon monoxide by a catalytic cracking of gaseous or vaporized hydrocarbons, the improvement comprising: completely combusting a part of the hydrocarbons at temperatures of about 800° to 1500° C. in a combustion zone, supplying an oxygen-containing gas to the combustion zone at a rate which corresponds to twice to ten times the stoichiometric oxygen demand, admixing preheated remainder of the hydrocarbons to the oxygen-containing combustion gas to produce a mixture at a temperature between about 700° and about 1300° C., passing the mixture through a fixed bed of a granular cracking catalyst, and withdrawing a high-CO product gas at a temperature between about 800° and about 1150° C. from the fixed bed.

2. A process according to claim 1, wherein the remainder of the hydrocarbons is preheated to between about 300° and about 600° C. before it is admixed to the combustion gas.

3. A process according to claim 1 or 2, wherein the mixture composed of the combustion gases and the remainder of the hydrocarbons is at a temperature between about 800° and about 1300° C.

4. A process according to claim 1, wherein the hydrocarbons are combusted in the combustion zone in the presence of an igniting catalyst.

5. A process according to claim 1, wherein the mixture composed of the combustion gas and the remainder of the hydrocarbons contains water vapor not in excess of 0.2 mole per mole of carbon.

* * * * *